(12) United States Patent
Whatcott et al.

(10) Patent No.: US 7,673,346 B1
(45) Date of Patent: Mar. 2, 2010

(54) INTRA-DATA LICENSE FOR USING DATA

(75) Inventors: Roland D. Whatcott, Salem, UT (US); Russell Marsh, Lindon, UT (US)

(73) Assignee: Symantec Corporation, Mountain View, CA (US)

( * ) Notice: Subject to any disclaimer, the term of this patent is extended or adjusted under 35 U.S.C. 154(b) by 1288 days.

(21) Appl. No.: 11/158,807

(22) Filed: Jun. 22, 2005

(51) Int. Cl.
*G06F 7/04* (2006.01)
*G06F 17/30* (2006.01)
*H04N 7/16* (2006.01)

(52) U.S. Cl. ............................. 726/27; 726/1
(58) Field of Classification Search ............ 726/1, 726/27, 28; 705/58, 59, 61
See application file for complete search history.

(56) References Cited

U.S. PATENT DOCUMENTS

| | | | | |
|---|---|---|---|---|
| 5,634,012 | A * | 5/1997 | Stefik et al. | 705/39 |
| 5,638,443 | A * | 6/1997 | Stefik et al. | 705/54 |
| 5,715,403 | A * | 2/1998 | Stefik | 705/44 |
| 5,771,354 | A * | 6/1998 | Crawford | 709/229 |
| 5,805,699 | A * | 9/1998 | Akiyama et al. | 705/58 |
| 6,662,284 | B2 * | 12/2003 | Gold | 711/163 |
| 6,684,308 | B2 * | 1/2004 | McNeil | 711/162 |
| 6,920,565 | B2 * | 7/2005 | Isaacson et al. | 713/193 |
| 6,944,734 | B2 * | 9/2005 | Anzai et al. | 711/163 |
| 7,010,809 | B2 * | 3/2006 | Hori et al. | 726/26 |
| 7,017,019 | B2 * | 3/2006 | Watanabe et al. | 711/162 |
| 7,117,329 | B2 * | 10/2006 | Watanabe et al. | 711/162 |
| 7,249,107 | B2 * | 7/2007 | Yaacovi | 705/59 |
| 7,296,068 | B1 * | 11/2007 | Sarma et al. | 709/223 |
| 7,325,247 | B2 * | 1/2008 | Kotani et al. | 726/6 |
| 7,339,869 | B2 * | 3/2008 | Ishibashi et al. | 369/53.21 |
| 7,383,462 | B2 * | 6/2008 | Osaki et al. | 714/2 |
| 7,415,115 | B2 * | 8/2008 | Ma | 380/286 |
| 7,529,927 | B2 * | 5/2009 | Peinado et al. | 713/156 |
| 7,590,856 | B2 * | 9/2009 | Morino et al. | 713/182 |
| 2001/0008016 | A1 * | 7/2001 | Kotani et al. | 713/193 |
| 2001/0020241 | A1 * | 9/2001 | Kawamoto et al. | 707/202 |
| 2001/0037357 | A1 * | 11/2001 | Anzai et al. | 709/203 |
| 2002/0116589 | A1 * | 8/2002 | Gold | 711/163 |
| 2002/0131594 | A1 * | 9/2002 | Hori et al. | 380/201 |
| 2002/0136405 | A1 * | 9/2002 | Hori | 380/203 |
| 2002/0188704 | A1 * | 12/2002 | Gold et al. | 709/221 |
| 2002/0196940 | A1 * | 12/2002 | Isaacson et al. | 380/227 |
| 2003/0028592 | A1 * | 2/2003 | Ooho et al. | 709/203 |
| 2003/0061136 | A1 * | 3/2003 | Inoue | 705/35 |
| 2003/0161064 | A1 * | 8/2003 | Hori et al. | 360/55 |
| 2003/0172035 | A1 * | 9/2003 | Cronce et al. | 705/59 |
| 2003/0177379 | A1 * | 9/2003 | Hori et al. | 713/193 |
| 2004/0103257 | A1 * | 5/2004 | Watanabe et al. | 711/162 |

(Continued)

*Primary Examiner*—David García Cervetti
(74) *Attorney, Agent, or Firm*—Advantedge Law Group

(57) ABSTRACT

Mechanisms for enforcing permissions on stored data. Prior to storing the data, a data structure containing the data is accessed, and then modified to include a license that represents permission(s) for how the data should be used when the data structure is later accessed. The modified data structure is then stored, after perhaps some optional transformation. When the data structure is later accessed, the license is acquired from the data structure. The license is then used to determine whether or not to honor specific requests to use the data. This determination may be made based on license validation instructions executed from a removable media. Furthermore, the license may be the exclusive determining factor for the license validation instructions in determining whether or not to honor specific requests.

13 Claims, 3 Drawing Sheets

U.S. PATENT DOCUMENTS

| | | | |
|---|---|---|---|
| 2004/0143818 A1* | 7/2004 | Kijima et al. | 717/122 |
| 2004/0196759 A1* | 10/2004 | Ishibashi et al. | 369/47.19 |
| 2004/0215644 A1* | 10/2004 | Edwards et al. | 707/100 |
| 2004/0215909 A1* | 10/2004 | Imai et al. | 711/163 |
| 2004/0228493 A1* | 11/2004 | Ma | 380/286 |
| 2004/0230817 A1* | 11/2004 | Ma | 713/193 |
| 2004/0236588 A1* | 11/2004 | Millard et al. | 705/1 |
| 2005/0071590 A1* | 3/2005 | Watanabe et al. | 711/162 |
| 2005/0099612 A1* | 5/2005 | Kirovski | 355/53 |
| 2005/0154907 A1* | 7/2005 | Han et al. | 713/193 |
| 2005/0160044 A1* | 7/2005 | Hori et al. | 705/51 |
| 2005/0182732 A1* | 8/2005 | Miller et al. | 705/59 |
| 2005/0241002 A1* | 10/2005 | Ueda | 726/27 |
| 2006/0005048 A1* | 1/2006 | Osaki et al. | 713/193 |
| 2006/0041421 A1* | 2/2006 | Ta et al. | 704/5 |
| 2006/0059103 A1* | 3/2006 | Ebihara et al. | 705/59 |
| 2006/0085792 A1* | 4/2006 | Traut | 718/100 |
| 2006/0164258 A1* | 7/2006 | Garibotto et al. | 340/937 |
| 2006/0168580 A1* | 7/2006 | Harada et al. | 717/174 |
| 2006/0179327 A1* | 8/2006 | Musa et al. | 713/193 |
| 2006/0287961 A1* | 12/2006 | Mori et al. | 705/59 |
| 2007/0061528 A1* | 3/2007 | Shibata et al. | 711/162 |
| 2007/0174606 A1* | 7/2007 | Nakano et al. | 713/153 |
| 2007/0223705 A1* | 9/2007 | Kasahara et al. | 380/281 |
| 2008/0052536 A1* | 2/2008 | Shimizu et al. | 713/193 |
| 2008/0260155 A1* | 10/2008 | Kasahara et al. | 380/277 |

* cited by examiner

US 7,673,346 B1

INTRA-DATA LICENSE FOR USING DATA

BACKGROUND OF THE INVENTION

Computing technology has transformed the way we work and play. The functionality of computing systems is dependent upon both hardware and software. Hardware includes, for example, output and input devices, processors, memory and storage devices, communication devices, power supply, cooling devices, and the like. Software, on the other hand, contains processor instructions and data, and is present in either or both of the memory and storage devices. The processor instructions are readable by the processor(s) and direct the operation of the processors to control the other hardware or perform calculations. The data is also critical as it allows the computing system to maintain state, and thereby preserve a proper context for operation.

Occasionally, it would be advantageous to enforce permissions on how data is used. For example, in a recovery environment, the data may be recovery data such as a volume image that had previously been backed up to a backup storage device. When subsequently restoring the recovery data to a computing system after a failure, it would be advantageous to determine if the restore is authorized on the computing system.

One conventional method for enforcing permissions for a computing system to use data is for the computing system to connect to an appropriate network site on the Internet, and provide appropriate credentials or other information to thereby allow the computing system to provide some security that the requested action on the data is authorized. Sometimes, those credentials are based upon the hardware environment of the computing system. However, not all computing systems are configured with an available Internet connection. Furthermore, in a recovery environment, a computing system that has been able to connect to the Internet may not be capable of accessing the Internet until further stages of the restore process. In addition, in a recovery environment, the computing system that restores the data may be different from the computing system that backed up the data. Accordingly, the hardware environment may have changed, thereby making it difficult to use a hardware imprint to validate the license to restore the data.

BRIEF SUMMARY OF THE INVENTION

The foregoing problems with the prior state of the art are overcome by the principles of the present invention, which are directed towards mechanisms for enforcing permissions on stored data. Prior to storing the data, a data structure containing the data is accessed, and then modified too include a license that represents permission(s) for how the data should be used when the data structure is later accessed. The modified data structure is then stored, after perhaps some optional transformation. When the data structure is later accessed, the license is acquired from the data structure. The license is then used to determine whether or not to honor specific requests to use the data. The license may be the sole source for information used to determine whether or not to honor specific requests. In one embodiment, the data structure is a volume image, and the license relates to whether or not the data may be restored, and under what conditions and restrictions.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for enforcing permissions on stored data. Prior to storing the data, a data structure containing the data is accessed, and then modified to include a license that represents permission(s) for how the data should be used when the data structure is later accessed. The modified data structure is then stored, after perhaps some optional transformation. When the data structure is later accessed, the license is acquired from the data structure. The license is then used to determine whether or not to honor specific requests to use the data. In one embodiment, the data structure is a volume image, and the license relates to whether or not the data may be restored, and under what conditions. The determination of whether or not to honor specific requests may be made based entirely on information within the license.

First, a general computing system will be described with respect to FIG. 1, as being a suitable computing system that may be used to practice the principles of the present invention. Then, the principles of the present invention will be described with respect to FIGS. 2 and 3.

Figure 1:
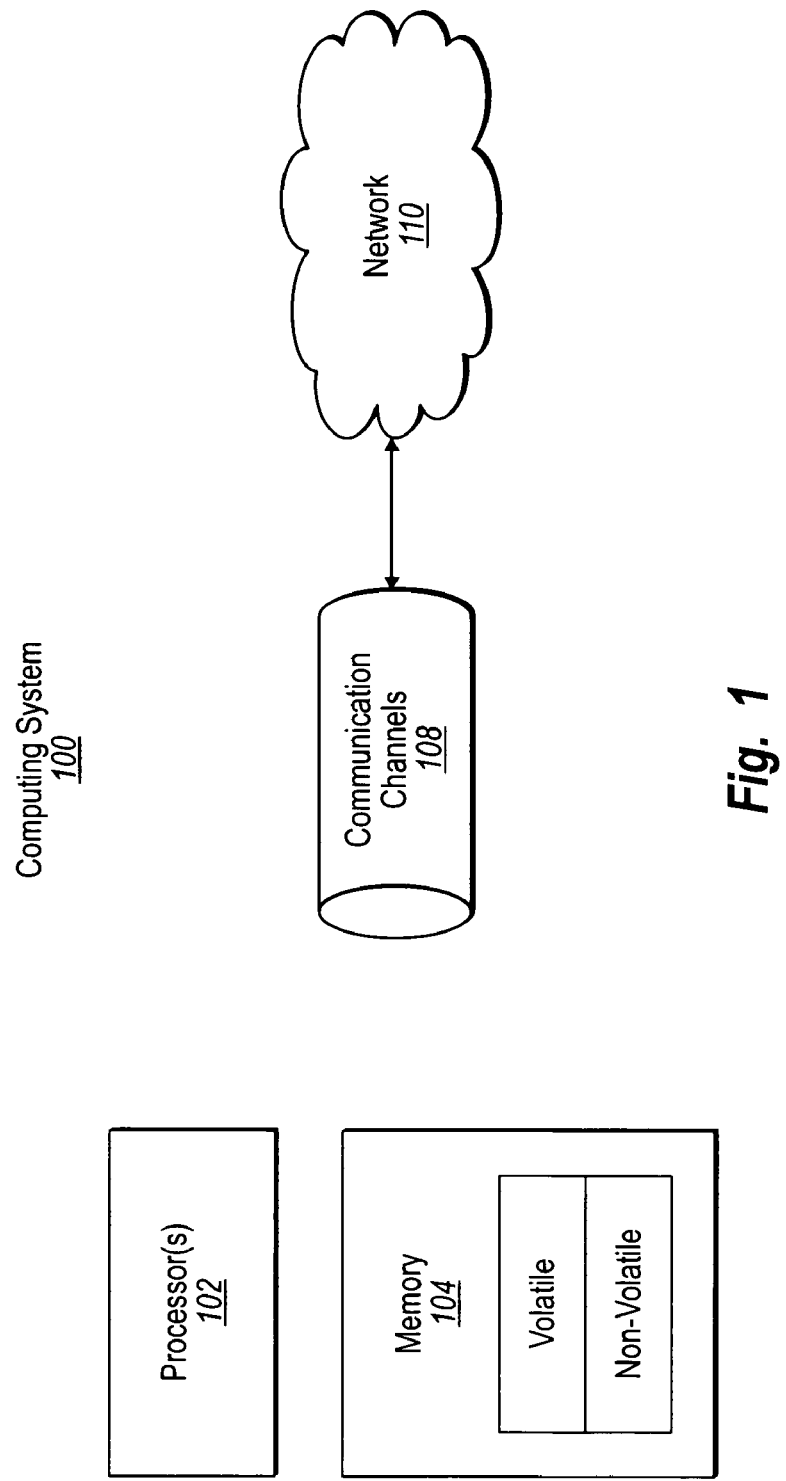
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software in the form of a computer program product, one or more processors of the associated computing system that performs the act direct the operation of the computing system in response to having executed computer-executable instructions from one or more computer-readable media. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
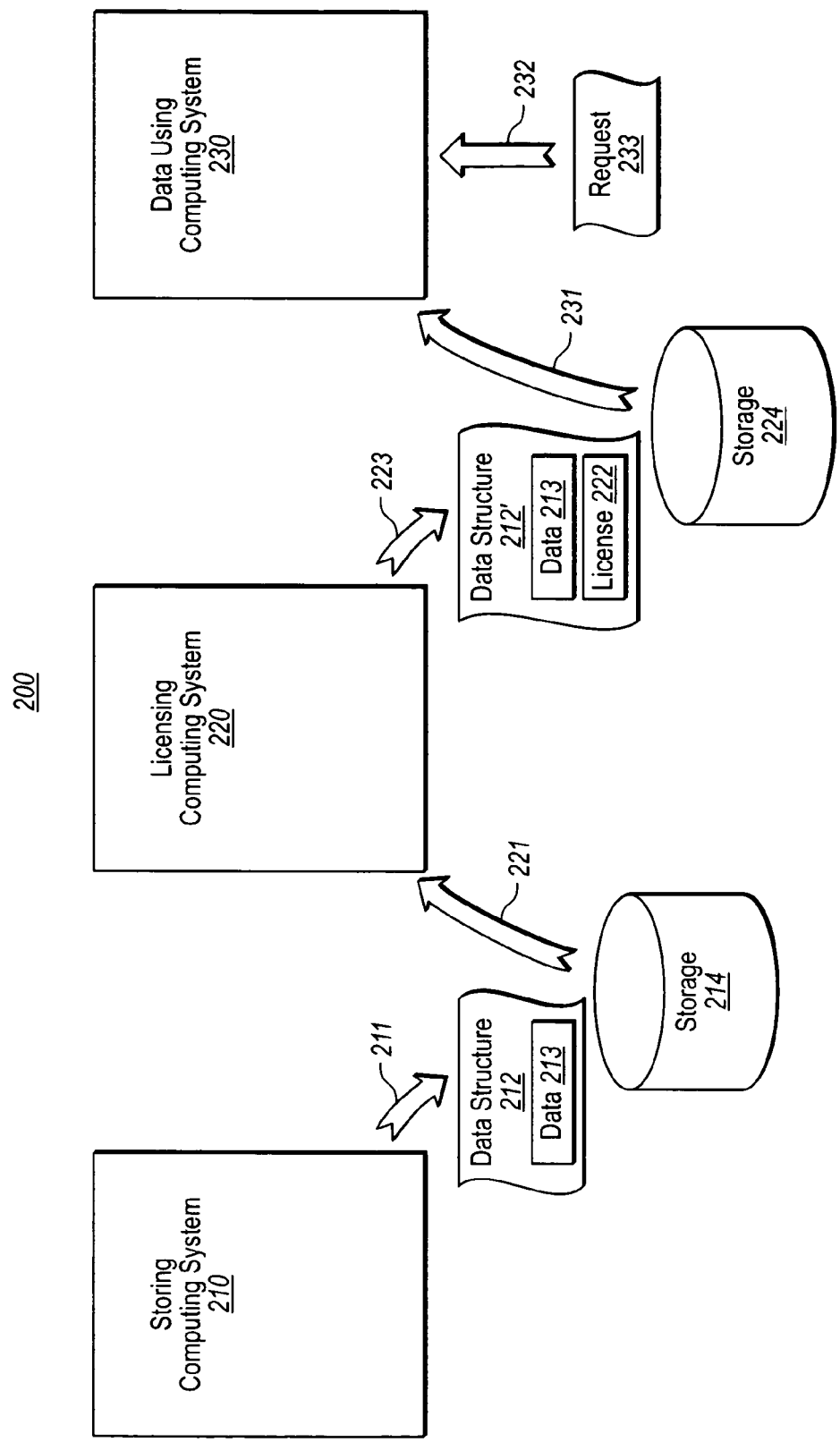
FIG. 2 illustrates a general environment in which the principles of the present invention may be employed.
Figure 3:
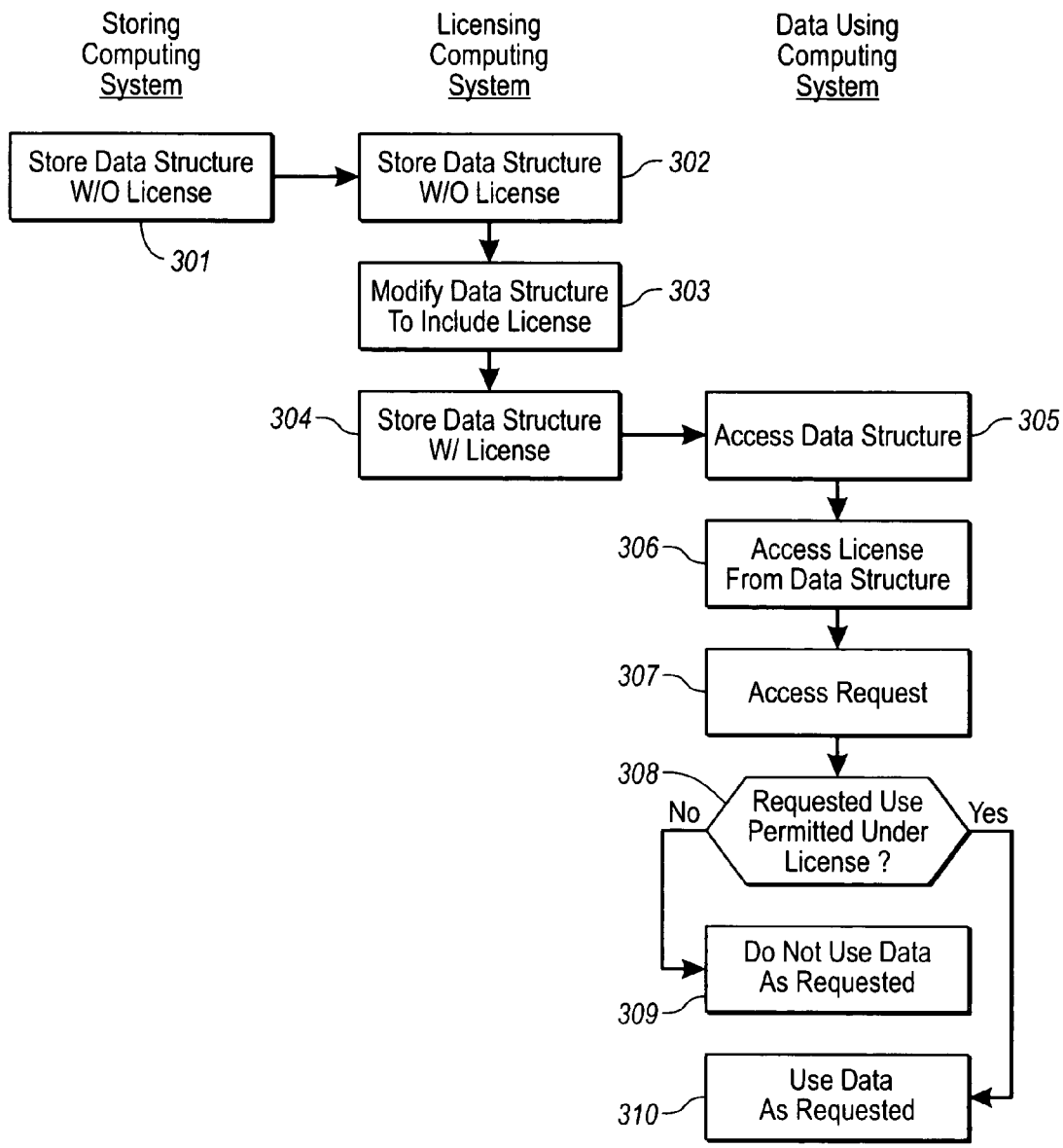
FIG. 3 illustrates a flowchart of a method for enforcing permissions on data in accordance with the principles of the present invention.

FIG. 2 schematically illustrates an environment 200 in which the principles of the present invention may be practiced. FIG. 3 illustrates a flowchart of a method 300 for enforcing permissions on stored data in accordance with the principles of the present invention. As the method 300 of FIG. 3 may be practiced in the environment 200 of FIG. 2, the method 300 of FIG. 3 will be described with frequent reference to the environment 200 of FIG. 2.

The method 300 optionally begins in some embodiments with a computing system (also called herein a "storing computing system") that stores a data structure that includes data, but does not include a license (act 301). For instance, referring to FIG. 2, the storing computing system 210 stores (as represented by arrow 211) a data structure 212 that has data 213, but no license, to storage 214. The data 213 represents all, or potentially only some, of the total data represented in the data structure 212. The data structure 212 may be, for example, a file, a group of files, a volume, a partial volume, a base or incremental image of a full or partial volume, or a transformed representation (e.g., a compressed and/or fully or partially encrypted version) of the same. In a volume backup/restore environment, the storing 211 of the data structure may represent the backing up of a volume image. The storing 211 may be over a network to a remote storage location, or may be to a local storage device. In this description and in the claims, "storing" a data structure is not restricted to the transfer of the entire data structure to the storage, but may also involve modifying a portion of the data structure, or merely letting the data structure remain in storage.

As previously mentioned, storing the data structure without the license (act 301) is only present in some embodiments of the invention. Regardless, a computing system (hereinafter referred to as a "licensing computing system") accesses the data structure that includes the data (act 302). In this description and in the claims, "accessing" a data structure does not necessarily mean that the entire data structure is transferred from storage, but perhaps only a small portion of the data structure is accessed. Referring to FIG. 2, the licensing computing system 220 accesses (as represented by arrow 221) the data structure 212.

The licensing computing system 220 then modifies the data structure 212 to include a license 222 (act 303). The license 222 represents one or more permissions for how the data 213 should be used when the data structure is later accessed. The accessing 221 may be a local storage access or a remote access over a network. The storage computing system 210 and the licensing computing system 220 may be the same computing system, although not required. The licensing computing system 220 then stores (as represented by arrow 223) the modified data structure 212' to storage 224 (act 304). Storage 224 may, but need not, be the same as storage 214.

A computing system (hereinafter also reference to as the "data using computing system") then accesses the modified data structure (act 305). For instance, referring to FIG. 2, the data using computing system 230 accesses (as represented by arrow 231) the data structure 212'. The data using computing system 230 may be the same as or different than the storing computing system 210 and/or the licensing computing system 220. Each of those computing systems may be, but absolutely need not be, structured as illustrated and described with respect to the computing system of FIG. 1. Once again, the accessing may be over a network, or from a local storage device.

The data using computing system then accesses the license from within the data structure (act 306). Referring to FIG. 2, the data using computing system 230 may access the license 222 from the data structure 212'. Once again, the license 222 represents one or more permissions regarding how the data 213 may be used. The data using computing system (or a software component thereon) enforces the permissions.

Referring to FIG. 3, the data using computing system accesses a request to perform an action with the data represented in the data structure (act 307). For instance, the data using computing system 230 accesses (as represented by arrow 232) the request 233. Although the act 307 is illustrated in FIG. 3 as happening after the act 305, this request 233 may be received at any time before or after the data using computing system 230 accesses 231 the data structure 212'. The data using computing system 230 may itself generate the request 233.

The data using computing system then evaluates the license to determine whether or not the requested action is permitted under the license (decision block 308). The software that evaluates the license may be secure so that the data using computing system only performs an action on the data if authorized under the license. Accordingly, if it is determined that the requested action is not authorized (No in decision block 308), the requested action is not performed (act 309). Otherwise, if the requested action is authorized (Yes in decision block 308), the requested action is performed (act 310).

The general principles of the present invention described and illustrated with respect to FIGS. 2 and 3 have various points of flexibility that enable a wide-variety of scenarios. These points of flexibility include the fact that one or more or all of the storing computing system, licensing computing system, and data using computing system may or may not be the same. The storage 214 and 222 may, or may not, be the same. The license may include any representation (from 1 bit to a complex secure certificate) that may, along with other information external to the license, permit the data using computing system to identify permissions to use the data. The storage and accessing processes may, or may not, be over a network.

One of the scenarios involves a backup and recovery environment. In one embodiment, the licensing computing system 220 is a client or server and the modified data structure 212' is a volume image (or a file) having an embedded license. The storage 224 may be a backup storage that serves the client or server, as well as potentially many other computing systems as well. The data using computing system 230 may be a system to which the data is to be restored, and might not be the same as the system that backed up the data. For instance, perhaps the system that was backed up was destroyed during a disaster event. The system that is to be recovered need not even have the same hardware or even access to the Internet in order to identify permissions to recover the data. The system may simply, for example, use a CD ROM program to execute a recovery program whereby the license is evaluated, and permissions strictly honored.

For instance, removable storage media (e.g., such as a CD-ROM, disk, or the like) may contain license validation computer-executable instructions that, when executed by one or more processors of the computing system 230, cause the computing system 230 to determine what actions are licensed and/or what actions are not licensed. These computer-executable instructions and the license may be structured such that the determination of what is and/or what is not licensed is dependent only upon information within the license itself.

In that embodiment, no external information would be required. Accordingly, the computing system 230 would not require access to any external sources of information in order to evaluate the license. In a recovery environment, this permits the license to be evaluated even if the computing system 230 has not yet been restored to a state in which it can access other sources of information. For instance, perhaps the computing system 230 has not yet been restored to a point where it can access the Internet. Instead, the computing system 230 would just access and execute the license validation instructions on the removable media.

The permissions for recovery may include, for example, whether or not to allow any sort of recovery, whether or not to allow recovery on a different system than the system that backed up the data (regardless of whether or not the hardware platform is the same), whether or not to allow recovery to a system in which the hardware platform is the same, whether or not to allow recovery to multiple systems, whether or not to allow recovery of certain types of files, whether or not to allow remote recovery (in which recovery is enabled without the user being present before the computing system being restored to) and the like.

In another backup/recovery scenario, the storing computing system 210 is the system being backed up, and the licensing computing system 220 is a computing system that manages the backed up data. The licensing computing system 220 centralizes the licensing process for the storing computing system 210 as well as perhaps other computing systems. That way, the system being backed up need not have the functionality to obtain and insert a recovery license.

Accordingly, the principles of the present invention permit for a determination of whether or not to allow requested actions on data without relying upon any particular hardware configuration, or network access. This may be used in a wide-variety of environments, including a backup and recovery environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for enforcing permissions on stored data, the method comprising:
an act of storing a backup of a volume;
adding a license to the backup wherein the license represents one or more permissions for how the data should be used when the backup is later accessed;
an act of accessing the backup;
an act of accessing the license from within the backup;
an act of accessing a request to restore the data represented in the backup; and
an act of evaluating the license to determine whether the request to restore the data is permitted under the license, wherein the result of the evaluation depends exclusively on information within the license.

2. A method in accordance with claim 1, wherein the act of storing the backup comprises an act of storing the backup with the license.

3. A method in accordance with claim 1, wherein adding the license to the backup comprises:
before the act of storing the backup, an act of accessing the backup without the license; and
an act of modifying the backup to include the license.

4. A method in accordance with claim 1, wherein the act of storing the backup comprises an act of providing the backup over a network to remote storage.

5. A method in accordance with claim 1, wherein the act of storing the backup comprises an act of providing the backup to a local storage device.

6. A method in accordance with claim 1, wherein the act of storing the backup and the act of accessing the backup are performed by different client machines.

7. A method in accordance with claim 1, wherein the request to restore the data comprises a request to restore the data to a client machine that performs the act of accessing the license from within the backup.

8. A method in accordance with claim 7, wherein the one or more permissions represented by the license are for restore options.

9. A method in accordance with claim 8, wherein the restore options comprise at least one of the following:

an option to restore to a client machine having a particular hardware configuration;

an option to restore to a client machine regardless of its hardware configuration;

an option to perform remote recovery; and an option to restore to multiple client machines.

10. A method in accordance with claim 9, wherein the act of evaluating the license to determine whether the request to restore the data is permitted under the license comprises an act of executing computer-executable instructions from a removable storage media, wherein the act of evaluating is performed as a result of the act of executing the computer-executable instructions.

11. A computer program product comprising one or more computer-readable media having thereon computer-executable instructions that, when performed by one or more processors of a computing system, cause the computing system to perform a method for enforcing permissions on stored data, the method comprising:

an act of storing a backup of a volume;

adding a license to the backup wherein the license represents one or more permissions for how the data should be used when the backup is later accessed;

an act of accessing the backup;

an act of accessing the license from within the backup;

an act of accessing a request to restore the data represented in the backup; and an act of evaluating the license to determine whether the request to restore the data is permitted under the license.

12. A computer program product in accordance with claim 11, wherein the one or more permissions represented by the license are for restore options.

13. A computer program product in accordance with claim 12, wherein the restore options comprise at least one of the following:

an option to restore to a client machine having a particular hardware configuration;

an option to restore to a client machine regardless of its hardware configuration; and an option to restore to multiple client machines.

* * * * *